United States Patent [19]
Galloway

[11] Patent Number: 5,699,048
[45] Date of Patent: Dec. 16, 1997

[54] OMNIDIRECTIONAL PASSIVE ELECTRICAL MARKER FOR UNDERGROUND USE

[75] Inventor: George G. Galloway, Graford, Tex.

[73] Assignee: Industrial Technology Inc., Mineral Wells, Tex.

[21] Appl. No.: 724,850

[22] Filed: Oct. 3, 1996

[51] Int. Cl.$^6$ .................................................. G08B 13/24
[52] U.S. Cl. ........................ 340/572; 340/825.39; 343/867
[58] Field of Search ........................... 340/572, 825.39; 324/239, 326, 226; 343/867, 866, 742

[56] References Cited

U.S. PATENT DOCUMENTS

| | | | |
|---|---|---|---|
| 3,683,389 | 8/1972 | Hollis | 343/867 |
| 3,689,885 | 9/1972 | Kaplan et al. | 340/152 T |
| 3,719,950 | 3/1973 | Bukhman et al. | 343/788 |
| 3,836,842 | 9/1974 | Zimmermann et al. | 324/34 R |
| 3,938,044 | 2/1976 | Lichtblau | 325/22 |
| 3,983,552 | 9/1976 | Bakeman, Jr. et al. | 340/280 |
| 4,118,693 | 10/1978 | Novikoff | 340/572 |
| 4,119,908 | 10/1978 | Cosman et al. | 324/3 |
| 4,292,590 | 9/1981 | Wilson | 324/226 |
| 4,334,227 | 6/1982 | Marks | 343/719 |
| 4,712,094 | 12/1987 | Bolson, Sr. | 340/572 |
| 4,761,656 | 8/1988 | Cosman et al. | 343/719 |
| 4,873,530 | 10/1989 | Takeuchi et al. | 343/711 |
| 4,894,663 | 1/1990 | Urbish et al. | 343/702 |
| 5,047,715 | 9/1991 | Morgenstern | 343/742 |
| 5,258,766 | 11/1993 | Murdoch | 343/867 |
| 5,280,296 | 1/1994 | Tan et al. | 343/718 |
| 5,281,941 | 1/1994 | Bernstein | 343/867 |
| 5,319,354 | 6/1994 | Myatt | 340/572 |
| 5,592,182 | 1/1997 | Yao et al. | 343/867 |

*Primary Examiner*—Thomas Mullen
*Assistant Examiner*—Davetta Woods
*Attorney, Agent, or Firm*—Geoffrey A. Mantooth

[57] ABSTRACT

A passive marker is placed adjacent to a structure in order to locate that structure after burial. The marker has a tuned circuit arrangement contained within a housing. The tuned circuit arrangement has plural tuned circuits that are oriented substantially orthogonally to each other. A multidirectional response pattern is produced by the tuned circuit arrangement, which pattern is broader than the directional response pattern of a single tuned circuit. The housing is divided into two hemispheres for ease of assembly. Each hemisphere has channels formed therein for receiving the respective tuned circuits. The channels can be formed by the exterior wall of the housing, interior walls of the housing, or in an interior spherical mandrel.

32 Claims, 12 Drawing Sheets

OMNIDIRECTIONAL PASSIVE ELECTRICAL MARKER FOR UNDERGROUND USE

FIELD OF THE INVENTION

The present invention relates to passive electrical markers that are placed underground for the purpose of locating buried structures.

BACKGROUND OF THE INVENTION

Buried structures include pipelines, cables, etc. Once a structure is buried in the ground, it becomes difficult to locate. Location is useful, for example, to dig up the structure for repair or to avoid the structure when performing nearby excavation.

Passive electrical markers are used to locate buried structures. The markers are located adjacent to a structure and then buried with structure.

Each marker contains a single tuned LC circuit. The LC circuit typically includes a coil of wire. In order to locate a buried marker, an operator moves across the surface of the ground with a transmitter and a receiver. The transmitter sends out an electromagnetic signal tuned to the frequency to the marker. Upon receiving the transmitted signal, the marker resonates and thus produces an electromagnetic response. This response is received by the above ground receiver and converted to a signal that is detectable by the operator (for example, an audio tone). The operator marks the pinpointed location on the ground using paint and then moves on to find the next marker buried along the structure.

Figure 1:
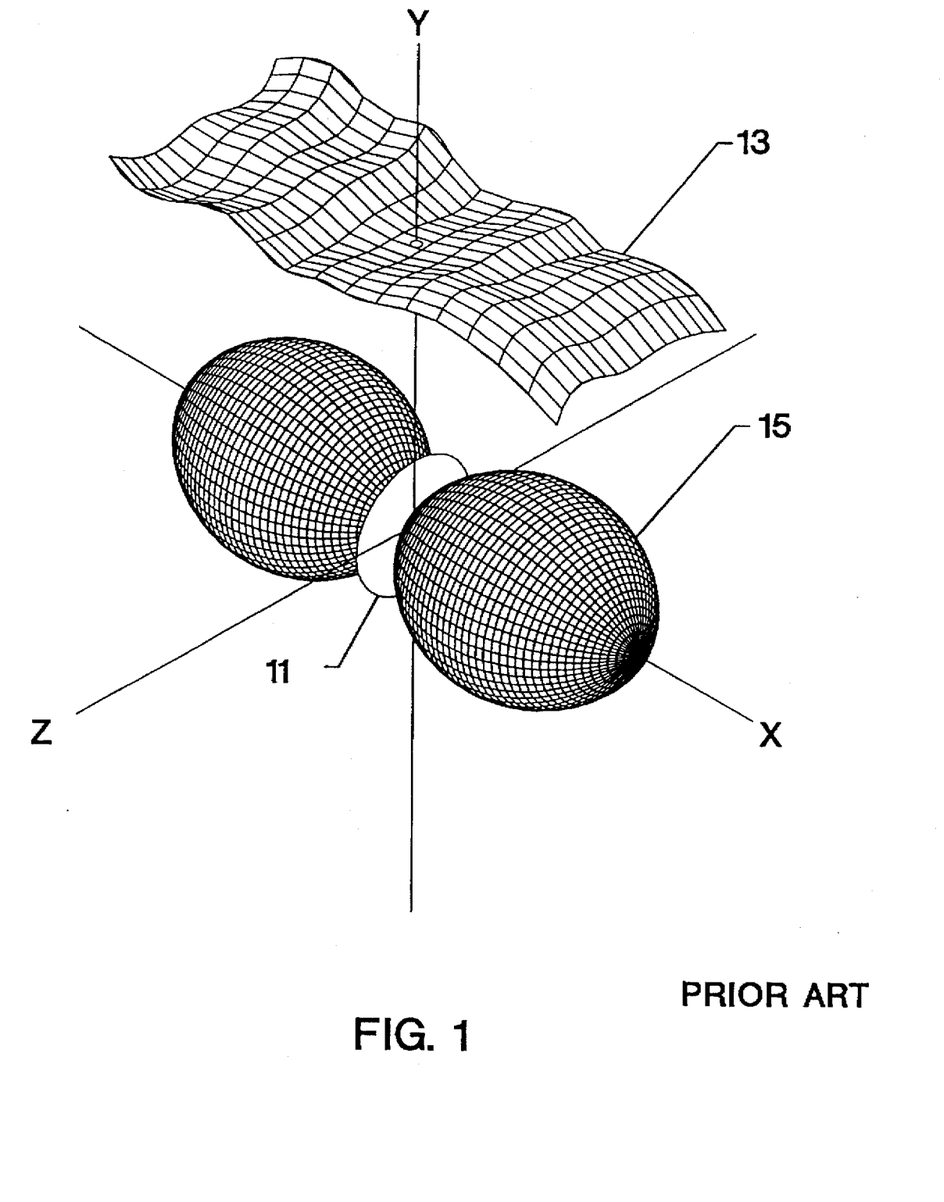
FIG. 1 is a schematic diagram of a directional pattern of a prior art tuned circuit, as discussed in the Background of the Invention.

A disadvantage to prior art markers is their need to be oriented correctly with respect to the surface of the ground. The tuned circuit in a marker produces a response in the shape of a dipole pattern, as shown in FIG. 1. In FIG. 1, the coil of the tuned circuit 11 is shown oriented in the YZ plane. If the ground surface 13 is located above the XZ plane, along the Y axis, then the response produced by the tuned circuit 11 is projected underneath and parallel to the ground surface. The directional pattern 15 of the response is shown as two lobes that extend along each direction of the X axis. The tuned circuit 11, and thus the marker, is essentially undetectable by the transmitter/receiver on the surface 13 of the ground.

The preferred orientation for such markers is to lay the tuned circuit 11 horizontally, so as to be parallel to the ground surface. This causes the response pattern to be projected towards the ground surface, thereby allowing detection.

Unfortunately, there is no assurance that a construction crew will take the time and care necessary to properly orient the tuned circuit. Furthermore, even if the tuned circuit is initially oriented properly, it can easily be moved, as dirt is dumped on top to bury the structure.

Bolson, U.S. Pat. No. 4,712,094 solves the orientation problem mechanically. Bolson uses the surface of a liquid to maintain the tuned circuit in a horizontal orientation. The liquid and the tuned circuit are inside of a hollow sphere. The tuned circuit freely floats on the surface of the liquid. Because the liquid surface is always horizontal, the freely floating tuned circuit is also horizontal.

The Bolson approach is costly because it requires a container inside of a container and also requires a fluid. Furthermore, the detectable range of the marker is decreased. This is because the diameter of the coil of the tuned circuit must be smaller than the inside diameter of the hollow sphere in order allow the tuned circuit to freely float therein.

SUMMARY OF THE INVENTION

It is an object of the present invention to provide an electrical marker for use in locating buried structures, which marker need not be specifically oriented with respect to the surface of the ground.

It is a further object of the present invention to provide an electrical marker for use in locating buried structures, which marker utilizes electrical principles to produce a detectable response independently of the marker's orientation with respect to the surface of the ground.

The present invention provides a passive marker for use in locating buried structures. The passive marker comprises plural tuned circuits. Each of the tuned circuits comprises an inductance and a capacitance. Each of the inductors has an axis. The tuned circuits are oriented such that the axes are angled with respect to each other. The oriented tuned circuits are contained within a housing, wherein the tuned circuits are capable of producing a broad directional response.

In accordance with one aspect of the present invention, the passive marker has three tuned circuits that are concentric and substantially orthogonal with respect to each other. In accordance with another aspect, each of the inductances has air core.

In accordance with still another aspect of the present invention, each of the tuned circuits are tuned to the same frequency. Alternatively, one of the tuned circuits is tuned to a first frequency, while another of the tuned circuits is tuned to a second frequency that is different from the first frequency.

Various types of housings can be used to enclose the plural tuned circuits. In accordance with one aspect of the present invention, the housing comprises substantially circular channels on an inside surface of the housing. Each of the channels receives one of the tuned circuits. The channels maintain the tuned circuits in the substantially orthogonal orientation. In one aspect, the housing is nonspherical, while in another aspect, the housing is spherical.

The channels can be formed by indentations in an exterior wall of the housing. Alternatively, the channels can be formed by interior walls that project inwardly from an exterior wall of the housing.

In another aspect of the present invention, each of the inductances comprises a coil that has individual turns of wire. The individual turns of wire are coupled together to form a band. The tuned circuits abut against an inside surface of the housing.

Alternatively, each inductor is wrapped around a mandrel, with the mandrel being contained within the housing. The mandrel can be shaped like a ball.

The present invention also provides a ground installation that comprises a structure buried in the ground and at least one passive marker buried in the ground adjacent to the structure. The passive marker comprises plural tuned circuits, with each of the tuned circuits comprising an inductance and a capacitance. Each of the inductances has an axis, and each of the tuned circuits has a directional pattern of response. The tuned circuits are oriented such that the axes are angled with respect to each other in order obtain a cumulative directional pattern from the plural tuned circuits that is broader than the directional pattern of any one of the tuned circuits. The tuned circuits are located in a sealed enclosure.

The present invention also provides a method of making a passive marker. Plural tuned circuits are provided, with each tuned circuit comprising a coil and a capacitance. Each coil has individual rams of wire that are coupled together so as to form a band. An enclosure is provided that has guides therein. The guides form channels on an inside surface of the enclosure. The channels are substantially orthogonal to each other and intersect each other. The enclosure is formed of plural portions. A first one of the tuned circuits is located in a first one of the channels. A second one of the tuned circuits is located in a second one of the channels. The second one of the tuned circuits is located either around or through a portion of the first one of the tuned circuits. The enclosure portions are brought together and the enclosure is sealed.

With the marker of the present invention, an omnidirectional response is provided. The marker is located adjacent to the structure which is to be marked. Installation of the marker occurs without regard to its orientation. This is because no matter how the marker is oriented, it will produce a response directed toward the ground surface.

The marker of the present invention provides for maximum range. This is because the size of the coil is almost the same as the inside diameter of the housing. By maximizing the size of the coil within a housing of fixed size, range of the marker is maximized.

Assembly of the marker is simple and inexpensive. The individual tuned circuits form bands. The housing provides the necessary guides to insure orthogonal orientation of the tuned circuits with respect to each other. During assembly, the bands are simply manipulated so as to place one band inside of another. The bands are then placed in the guides or channels before sealing the enclosure.

DESCRIPTION OF PREFERRED EMBODIMENTS

The present invention provides an electrical solution to the problem of producing a response that extends from the marker up towards the surface of the ground for all orientations of the marker. The marker 9 (see FIG. 5) produces an omnidirectional response. The omnidirectional response is accomplished by providing three tuned circuits that are orthogonally oriented with respect to each other. The three tuned circuits are placed into a housing, which housing is then buried.

Figure 2:
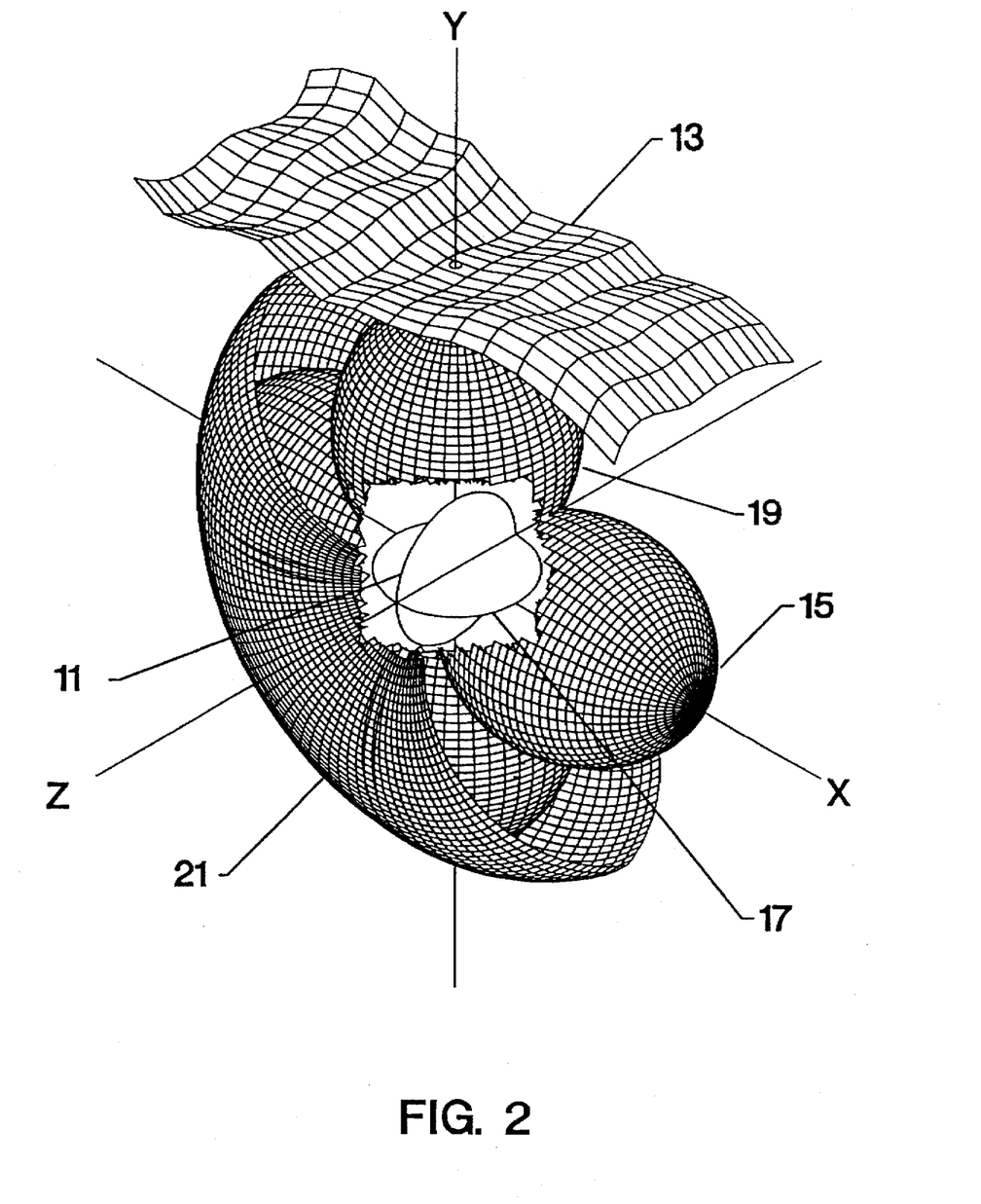
FIG. 2 is a schematic diagram of the directional patterns of two orthogonal tuned circuits, which diagram is used to illustrate the principles of the present invention.
Figure 3:
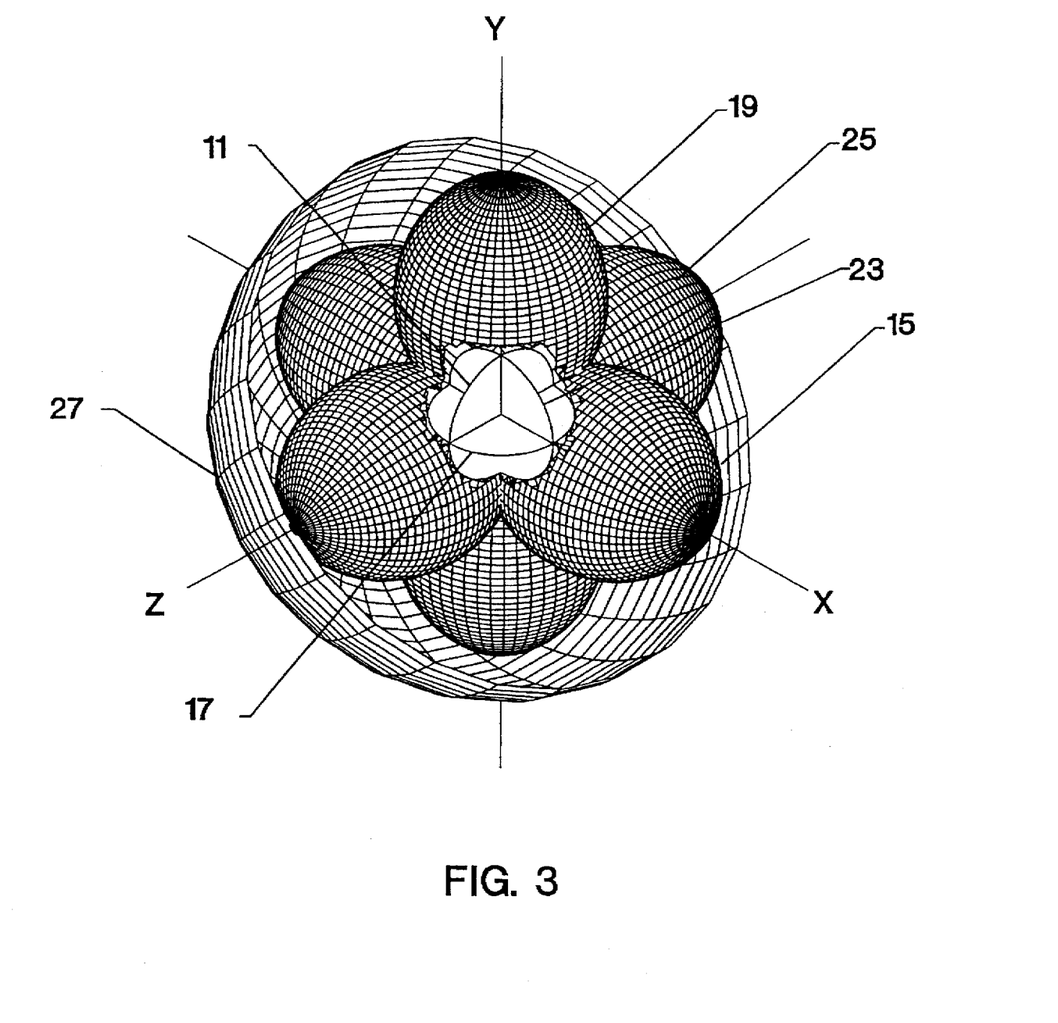
FIG. 3 is a schematic diagram of the directional patterns of three orthogonal tuned circuits, which diagram is used to illustrate the principles of the present invention.

To discuss the principles underlying the invention, reference is made to FIGS. 1–3. The figures show an XYZ coordinate system for reference. The X, Y, and Z axes are orthogonal to each other. In FIG. 1, a single tuned circuit 11 is shown. The tuned circuit has a coil that provides the inductor element of the tuned circuit. The coil has an axis that is coaxial with the X axis of FIG. 1. The directional pattern 15 produced by the tuned circuit extends along the X axis.

FIG. 2 shows two tuned circuits 11, 17. Each tuned circuit has a coil. The coils are orthogonal to each other. Thus, the coil of one tuned circuit 11 has the X axis for its axis. The directional pattern 15 of this tuned circuit 11 extends along the X axis. The coil of the other tuned circuit 17 has the Y axis for its axis. The directional pattern 19 of this tuned circuit 17 extends along the Y axis, towards the ground surface 13. The two directional patterns 15, 19 produce a cumulative directional pattern 21 that is in the shape of a toroid.

To make an omnidirectional pattern, a third tuned circuit 23 is added as shown in FIG. 3. Each tuned circuit has a coil. The coils are all orthogonal to each other. The coils of two of the tuned circuits 11, 17 are as described above. The coil of the third tuned circuit 23 has the Z axis for its axis. This third tuned circuit 23 produces a directional pattern 25 that extends along the Z axis. All three tuned circuits 11, 17, 23 produce a cumulative directional pattern 27 in the shape of a sphere. Thus, no matter what the orientation of the tuned circuit arrangement, the response (as shown by the spherical directional pattern) from the tuned circuit arrangement will project towards the ground surface.

The toroid pattern of FIG. 2 is broader than the dipole pattern of FIG. 1. The spherical pattern of FIG. 3 is broader than the dipole and toroid patterns of FIGS. 1 and 2. The responses from the individual tuned circuits positively sum with each other to produce a broader cumulative response than is available from just a single tuned circuit.

Figure 4:
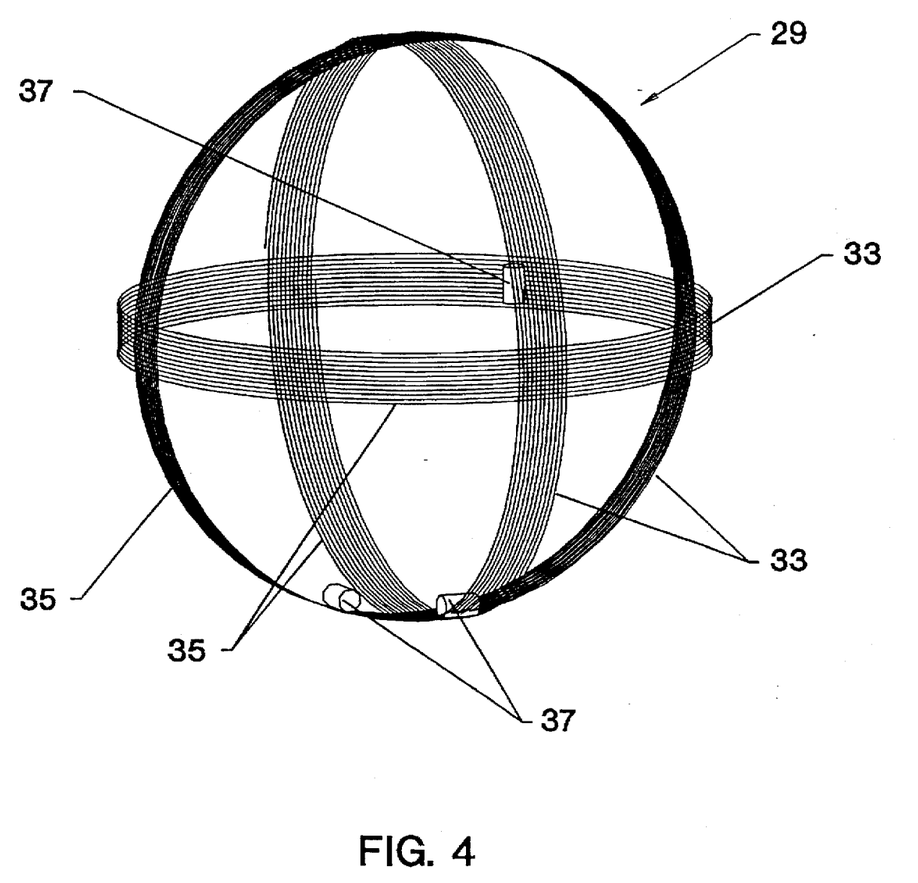
FIG. 4 is a schematic diagram of a tuned circuit arrangement in accordance with a preferred embodiment.
Figure 5:
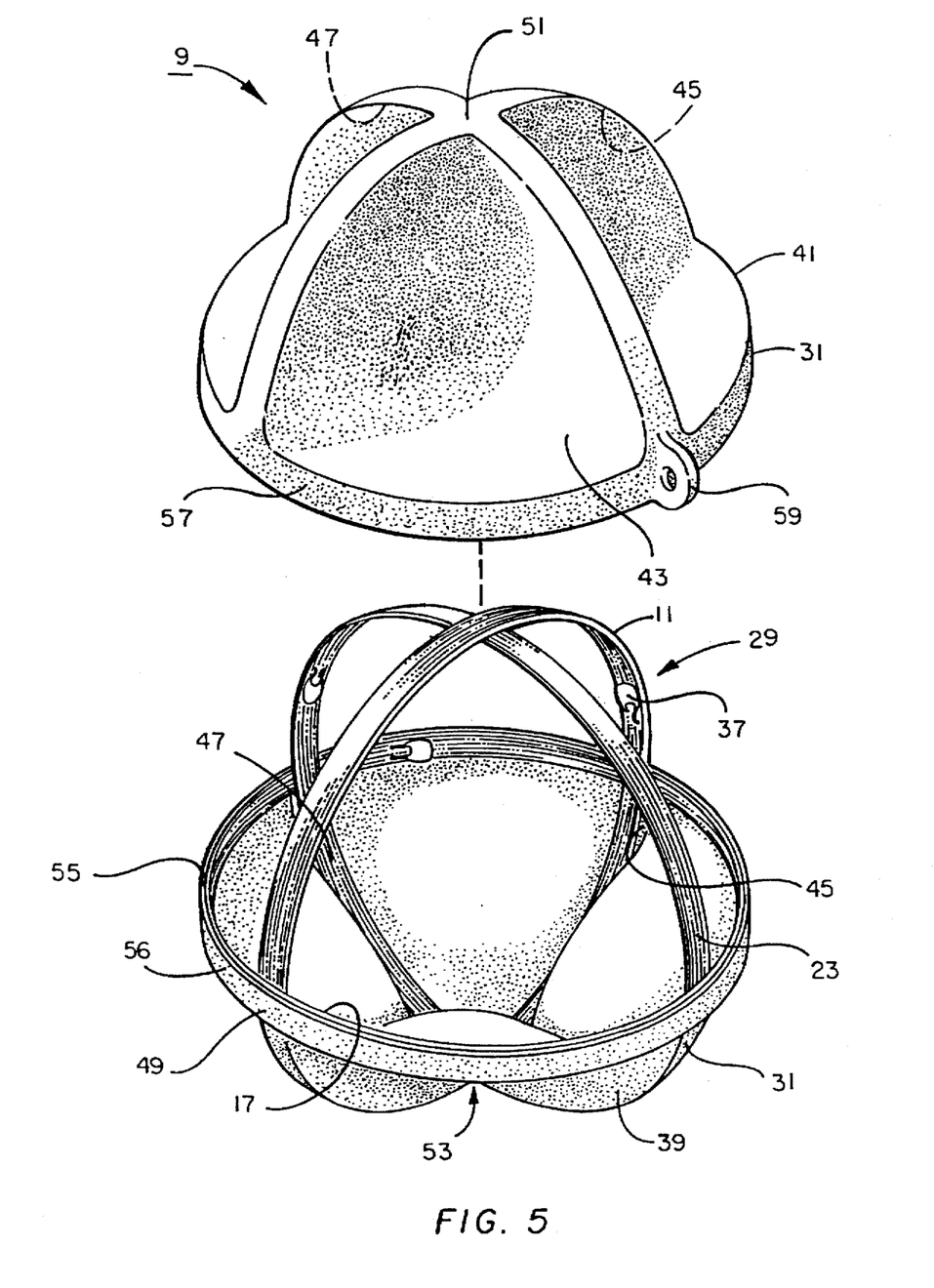
FIG. 5 is an exploded view of a marker of the present invention, in accordance a preferred embodiment.

The marker 9 of the present invention includes a tuned circuit arrangement 29 and a housing 31 or enclosure for the tuned circuit arrangement (see FIGS. 4 and 5).

The tuned circuit arrangement 29 is shown in FIG. 4. The tuned circuit arrangement has three tuned circuits 33. Each tuned circuit has a coil 35 and a capacitor 37. The respective capacitor 37 is connected in parallel with the respective coil.

Each coil 35 is made of copper wire (or some other conductor) and has an air core. In an alternate embodiment, a solid core (such as iron or ferrite) can be used for each coil. To make the coil, the wire, which is insulated, is wrapped around a mandrel. The individual turns of wire are then coupled together by an adhesive or some other means. For example, the wire can be heated and then cooled to cause a bonding material to melt and then fuse to the adjacent bonding material. The individual turns of wire remain insulated. After fusing the wires together, the coil is pulled off of the mandrel. The coil forms a unitary band structure. The coil need not circular. The coil is resilient to minor deformations of its shape. Thus, the coil can be pressed into an oval shape and upon release will resume its circular shape. The coils 35 are all the same size.

Each capacitor 37 is electrically connected across the two ends of the respective coil wire. In the preferred embodiment, the capacitor is located within the inside diameter of the respective coil. Together, the coil and the capacitor make up a tuned circuit that is tuned to a particular frequency.

Each coil has an axis that extends perpendicular to the plane containing the coil. The coil 35, and the tuned circuits 33 themselves, are orthogonal to each other. Thus, the tuned circuit arrangement 29 produces the spherical and omnidirectional pattern 27 shown in FIG. 3. The three tuned circuits 33 are concentric to each other.

Referring to FIG. 5, the housing 31 encloses the tuned circuit arrangement 29, protecting it from the environment. In the preferred embodiment, the housing 31 is made up of first and second hemispherical portions 39, 41. In FIG. 5, each portion is not truly hemispherical in shape, having indented regions 43. The housing portions are plastic or some other nonconductive material.

The housing 31 forms a hollow enclosure. When the portions 39, 41 are assembled, there are three orthogonal circular channels 45, 47, 49 therein so as to maintain the orthogonal relationship of the tuned circuits 11, 17, 23. Thus, there are first, second, and third channels 45, 47, 49. The channels are formed on the inside surface of the housing portions. The exterior wall of the housing, with its indented regions 43, form the channels.

To describe the channels, the housing will be considered as a globe, with poles 51, 53 and an equator 55. The first channel 45 extends from a first pole 51, through the equator 55 at 0°, to the second pole 53, back through the equator 55 at 180°, and back to the first pole. The second channel 47 extends from the first pole 51, through the equator 55 at 90°, to the second pole 53, back through the equator 55 at 270°, and back to the first pole. The third channel 49 extends all around the equator 55. The first housing portion 39 contains the third channel 49 in the form of a lip 56. The second housing portion 41 has a lip 57 at the equator that fits over the outside diameter of the first housing portion lip 56.

To assemble the marker 9, the tuned circuits 11, 17, 23 are inserted into the channels of the first housing portion 39. The tuned circuit arrangement 29 can be assembled first and then inserted into the first housing portion. However, it is simpler to use the channels as a guide for orienting and retaining the tuned circuits, by placing the individual tuned circuits therein. For example, a first tuned circuit 11 is placed into the first channel 45 of the first housing portion 39. Then, a second tuned circuit 23 is inserted into the first tuned circuit 11 and placed into the second channel 47 of the first housing portion. The first tuned circuit 11 can be lifted out of the first housing portion 39 while the second tuned circuit 23 can be flattened slightly during its insertion through the first tuned circuit. The thickness of each coil is slight, being only slightly greater than the thickness of the wire. Therefore, the second tuned circuit need to be deformed only slightly. Next, the third tuned circuit 17 is placed over the first and second tuned circuits 11, 23 and placed into the third channel 49.

Glue or other adhesive can be used in the channels to retain the tuned circuits therein during assembly. The capacitors are located on the inside diameter of the coils and are preferably located so as to not contact an orthogonal coil.

Once the tuned circuits have been placed into the first housing portion 39, the second housing portion 41 is then placed over the exposed tuned circuits and on to the first housing portion 39. The channels in the second housing portion are aligned with the tuned circuits before the two portions 39, 41 are assembled together. This forms the enclosure shown in FIG. 6. The first and second housing portions 39, 41 are sealed together by various means. For example, the two portions can be ultrasonically welded together around the equator 55. As another example, water tight adhesive can be used to seal the two portions together.

The timed circuits are preferably electrically insulated from one another. Thus, the tuned circuits form three separate circuits. It is believed that if the tuned circuits are electrically connected together, then the response of the marker may be degraded. The tuned circuits are electrically insulated from any conductor that is located outside of the housing. However, the tuned circuits are not isolated from electromagnetic fields outside of the housing and are in fact responsive to such fields.

Figure 6:
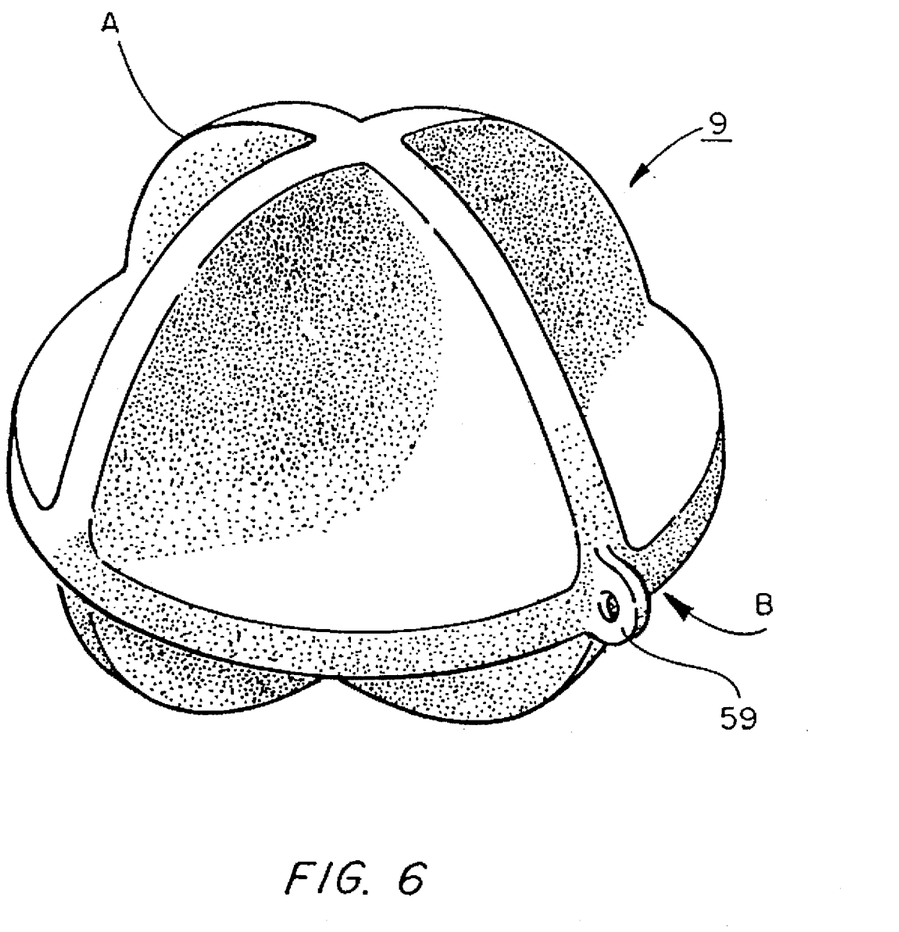
FIG. 6 is the assembled marker of FIG. 5.
Figure 7:
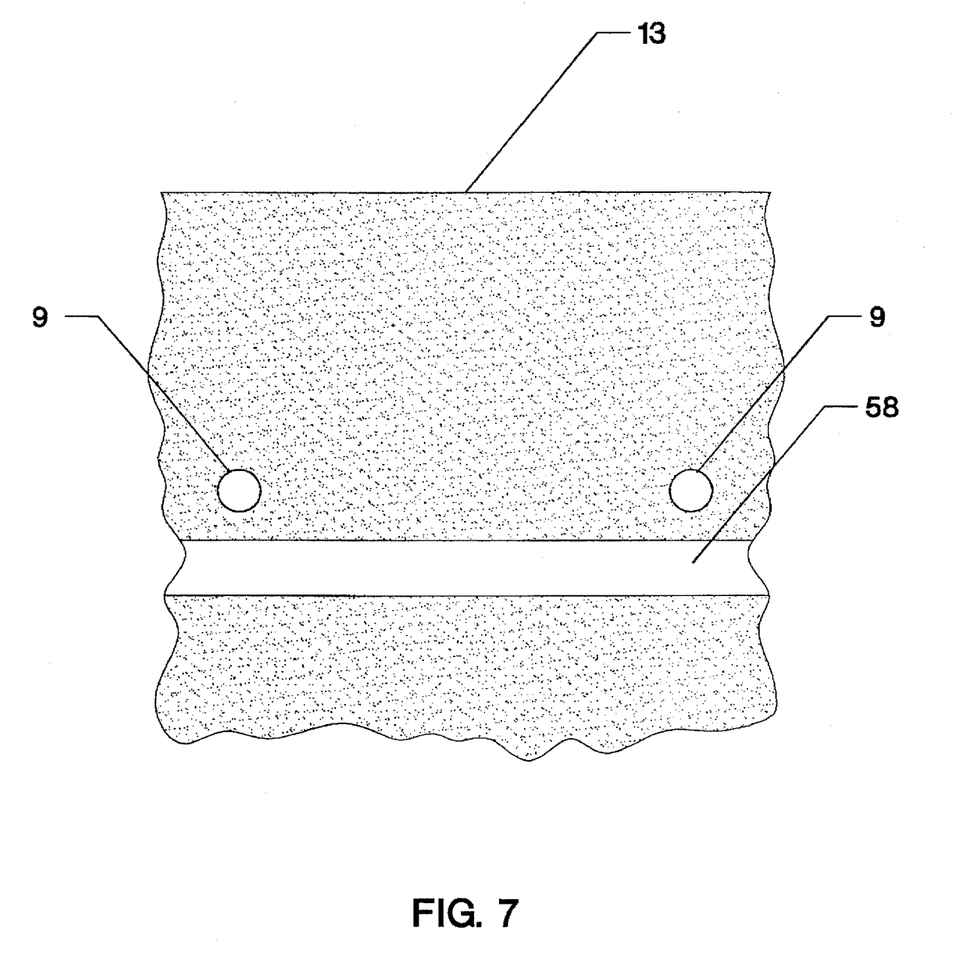
FIG. 7 is a schematic view of a marker and a buried structure.

The marker 9 is now ready for burial. In accordance with conventional practice, the marker is buried whenever the structure which is to be marked is buried (see FIG. 7). For example, for a cable, a trench is dug and the cable is laid into the trench. Markers are then placed in the trench at periodic intervals of distance. Each marker is placed adjacent to the cable. The markers can be placed above, below, or laterally of the cable. The marker has one or more loops 59 (FIG. 6) that can be used to secure the marker to the cable. For example, a tie can be threaded through the loops and around the cable to secure the marker thereto. The marker need not be oriented in any particular manner in the trench. This is because the marker is omnidirectional. After the markers are placed adjacent to the cable, the trench is filled in, thus burying the cable and the markers, as shown in FIG. 7.

The housing 31 maximizes the diameter of the coils 35. This is because the housing 31 has a relatively thin wall. The coils are abutted against the inside surface of the housing. It is desirable to make the physical diameter of each coil as large as possible. A large diameter coil gathers more electromagnetic energy from the transmitted signal than does a small diameter coil. If more electromagnetic energy is gathered, then a larger magnitude response is produced by the marker, thereby increasing the effective range of the marker. A practical consequence of having increased range is that the marker can be buried more deeply or the marker is easier to locate.

However, the physical size of the marker is limited by practical considerations. For example, the markers are transported to the work site by truck. The truck has a limited amount of storage capacity. Therefore, the larger the markers the fewer markers that can be carried. Also, the size of the trench may prohibit the use of large markers. If a marker is too big to fit into a trench, then it cannot be used.

Figure 8:
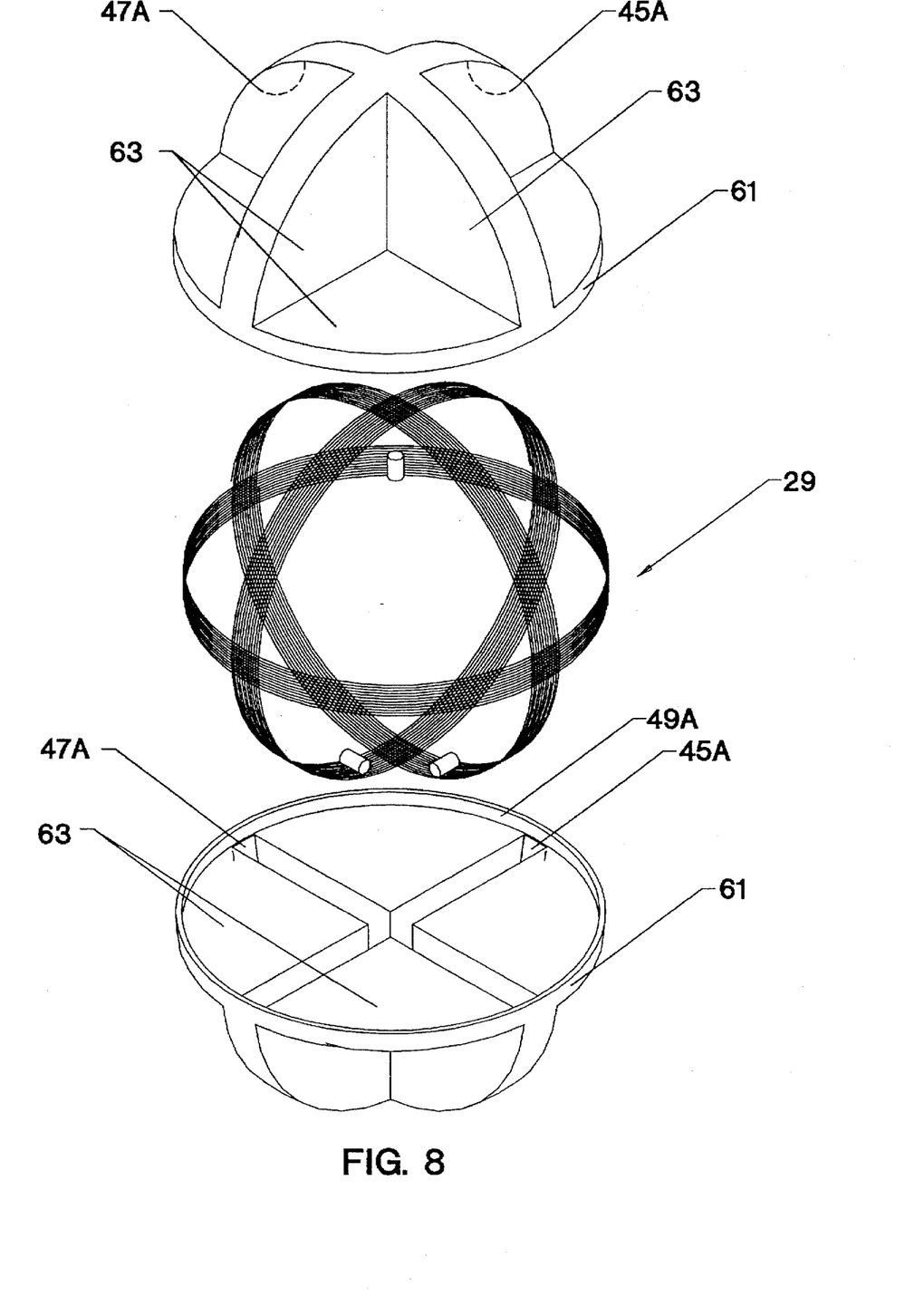
FIG. 8 is an exploded isometric view of the marker of the present invention, in accordance with another embodiment.

Other types of housings can be utilized. FIG. 8 shows one such housing 61. The housing has three orthogonal channels 45A, 47A, 49A that are similar to the channels 45, 47, 49 of FIG. 5. The channels 45A, 47A, 49A are for receiving the tuned circuits and are even more sharply defined in this embodiment than in the embodiment of FIG. 5. Each channel is formed by exterior walls 63. The walls 63 forming each channel are orthogonal to the walls forming the other channels.

Figure 9:
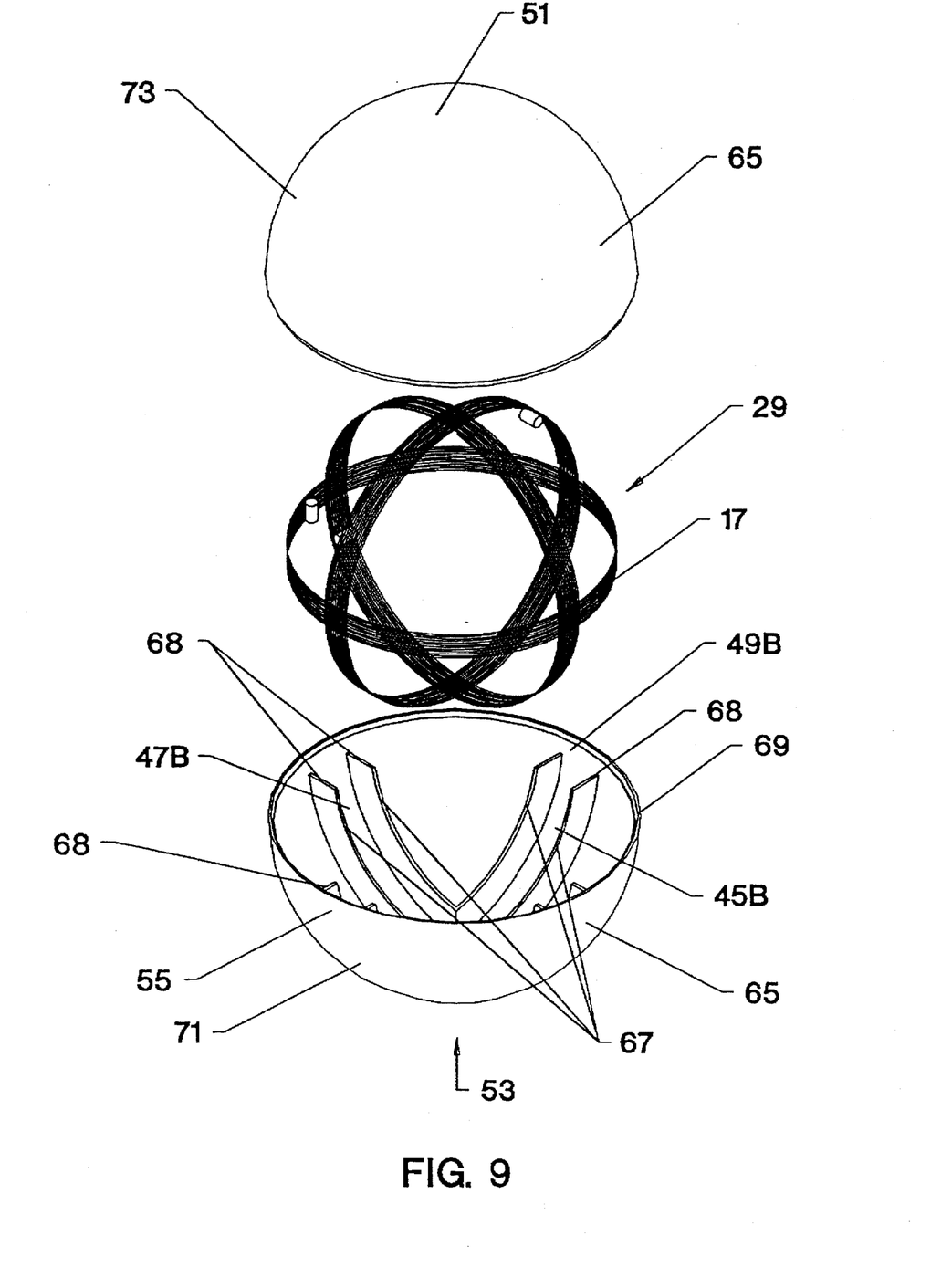
FIG. 9 is an exploded isometric view of the marker of the present invention, in accordance with still another embodiment.

FIG. 9 shows a spherical housing 65. The housing 65 has three orthogonal channels 45B, 47B, 49B for receiving the tuned circuits. The channels 45B, 47B, 49B are formed on the inside surface of the housing. Two of the channels 45B, 47B are not formed by the exterior walls of the housing as in FIGS. 5 and 8. Instead, these channels (which pass through the poles 51, 53) are formed by interior walls 67. The interior walls 67 have ends 68 that are located inside of the housing portion edge 69. The tuned circuit 17 that extends around the equator 55 bears on these ends 68. Each portion 71, 73 of the housing has a set of the interior walls 67 to position and hold the tuned circuit arrangement 29.

Figure 10:
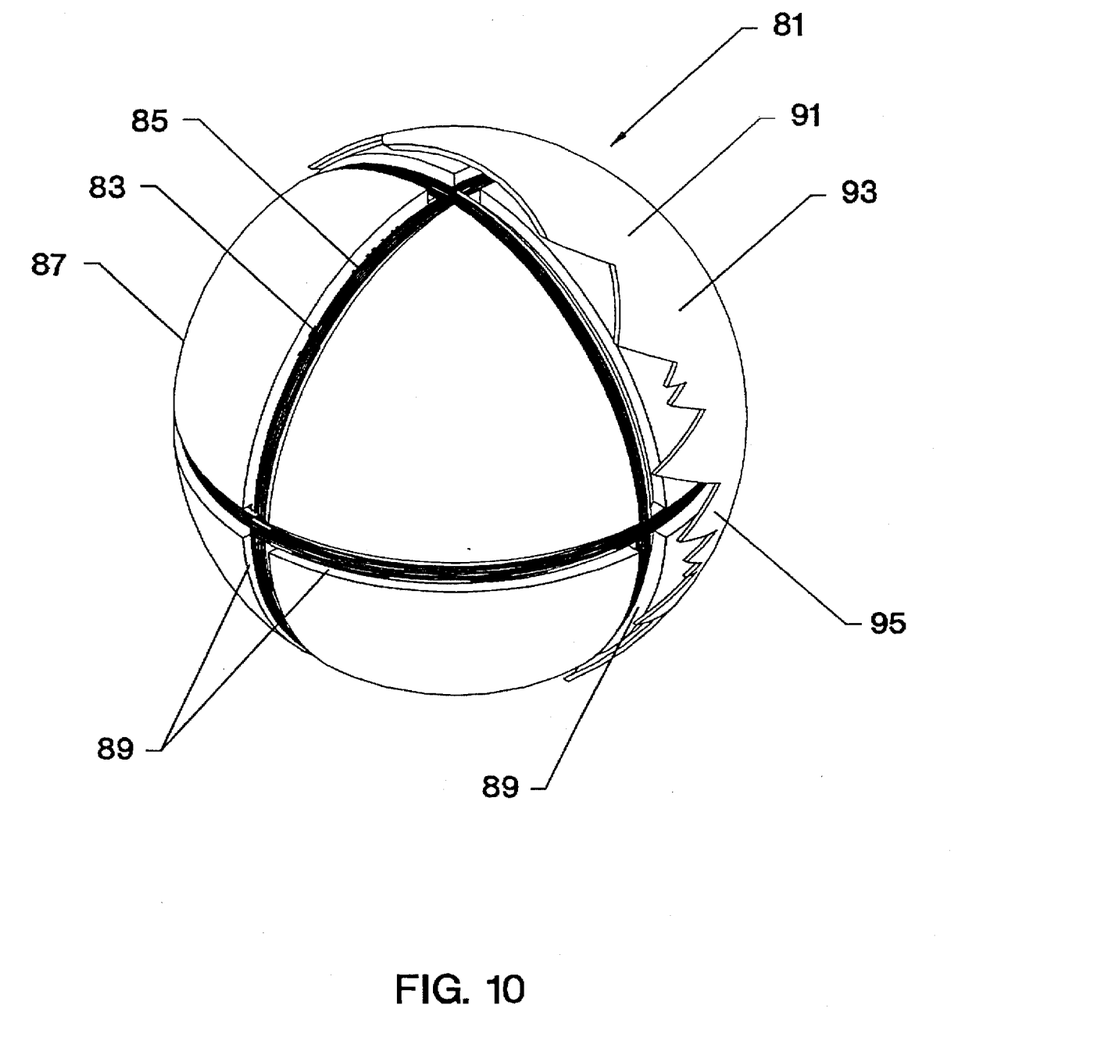
FIG. 10 is a partially cut away view of still another embodiment of the marker of the present invention.

Still another embodiment of the marker 81 is shown in FIG. 10. In this embodiment, the coils 83 of the tuned circuits 85 are wrapped around a common spherical mandrel 87. The outer surface of the mandrel has three grooves 89 therein, which grooves are orthogonal to each other. The tuned circuits are located in the respective grooves. Unlike the other markers of FIGS. 5–9, the coils of this marker are wrapped onto the mandrel 87 and left thereon. The mandrel 87 and tuned circuit arrangement are then sealed within a spherical housing 91. The housing 91 can be divided into the two hemispheres 93, 95. The mandrel and the tuned circuit arrangement are placed into one hemisphere. Then, the other hemisphere is placed over the exposed portion of the mandrel. The two edges of the hemispheres are then sealed. The outside diameter of the mandrel 87 can be slightly less than the inside diameter of the housing 91. However, the mandrel can be sized smaller so as to allow the mandrel to move around inside of the housing. The tuned circuit arrangement is omnidirectional and can thus be oriented independently of the ground surface in the housing.

Typically all of the tuned circuits in the marker of the present invention will be tuned to the same frequency. It is common practice in the industry to assign frequencies to particular applications. For example, markers used with telephone cables are tuned to a different frequency than are markers used with sanitary lines. Also, the housings are colored coded. For example, markers used with telephone cables are colored orange, while markers used with sanitary lines are green.

A marker can have its tuned circuits tuned to different frequencies. For example, in a single marker, one tuned circuit is tuned to a first frequency, while the other tuned circuits are tuned to a second frequency. Alternatively, all three tuned circuits can be tuned to different frequencies. Use of plural frequencies provides more information than simply the physical location of a marker. For example, plural frequencies can be used to define the orientation of the marker itself. Such information is useful if the marker is incorporated into the buried structure. The tuned circuits can be incorporated into a pipeline, with the pipeline having a jacket to form the housing. As another example, the frequencies of the tuned circuits can provide information on when the markers were buried. Markers buried in a particular year would have a distinctive combination of frequencies.

Although the tuned circuits have been described as being orthogonal to each other, the tuned circuits need not be exactly orthogonal. The tuned circuits can be substantially orthogonal or at near right angles to each other. The tuned circuits can be less than substantially orthogonal to each other. For example, if two tuned circuits are oriented at 45° with respect to each other, their cumulative directional response pattern is broader than is the directional response pattern from one tuned circuit.

Although the marker has been described as having three tuned circuits, the marker could have two tuned circuits. Such a marker would produce toroidially shaped pattern, as shown in FIG. 2. In fact, with the housing 31 of FIG. 5, installing the marker so as to project a portion of the response pattern towards the ground surface is assured in some circumstances. For example, in a 5 inch wide trench, a marker having 6 inch diameter coils can be used. Referring to FIG. 6, the distance between sides A and B of the marker is less than 6 inches, and is actually about 5 inches. Therefore, the marker can be placed into the trench with sides A and B abutting the side walls of the trench. The poles of the housing are approximately horizontal. The two tuned circuits pass through the poles of the housing, thereby producing a toroidially shaped pattern, a portion of which extends up towards the surface of the ground.

Figure 11:
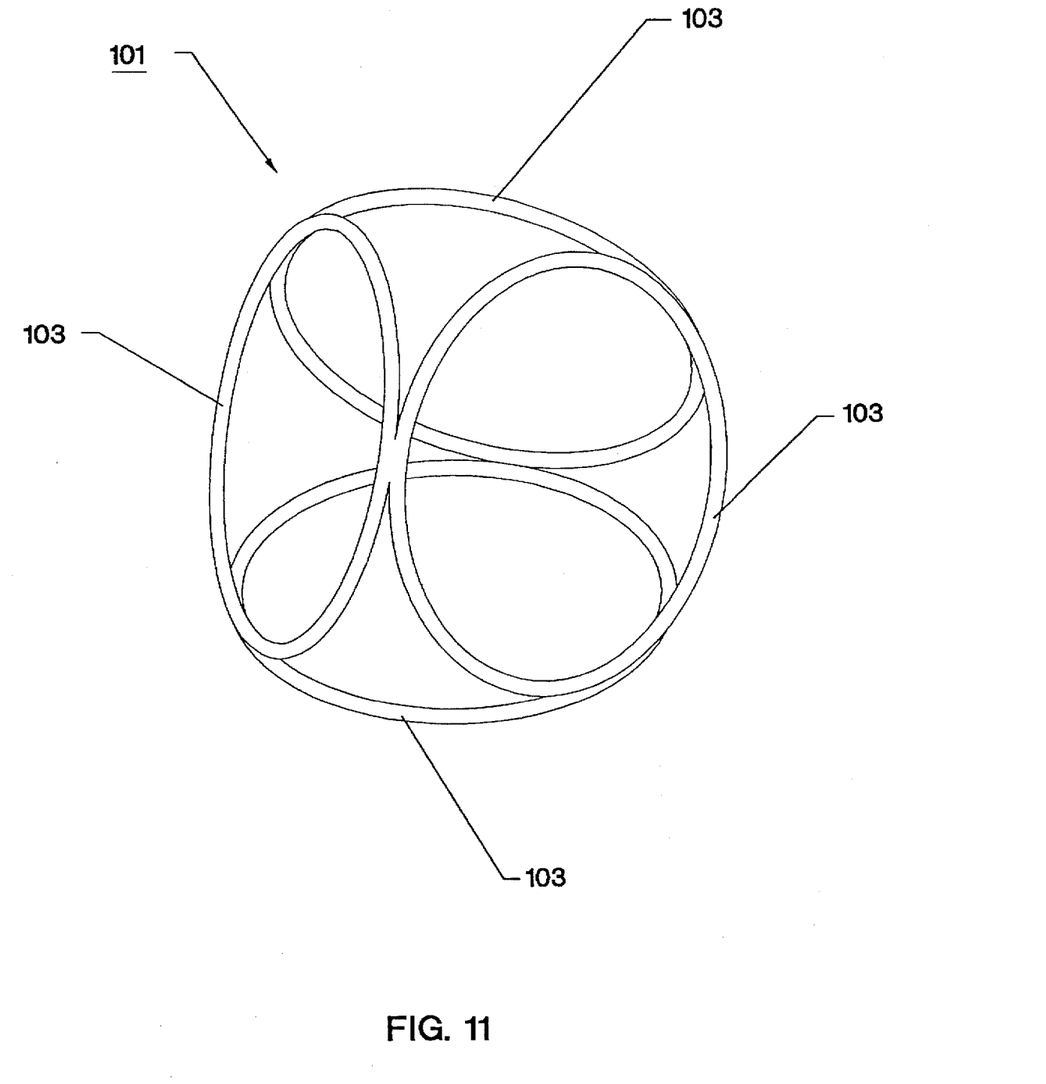
FIG. 11 and 12 are schematic diagrams of tuned circuit arrangements in accordance with other embodiments.
Figure 12:
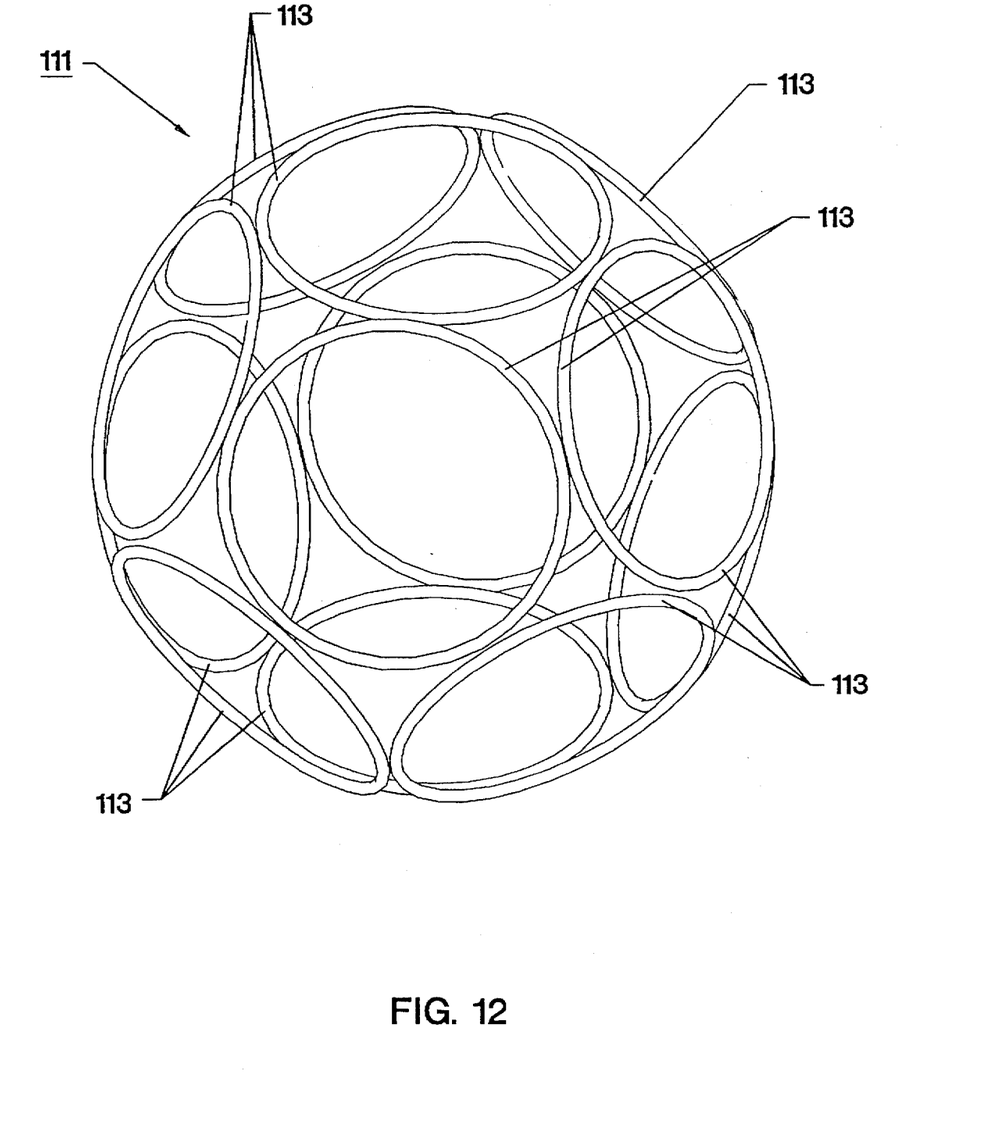

Although the marker of the present invention has been described as having 2 or 3 tuned circuits, the marker could have more tuned circuits. For example, the marker could have four tuned circuits. FIG. 11 shows a tuned circuit arrangement 101 that has four tuned circuits 103. The axis of each tuned circuit is oriented at less than 90° with respect to the axes of the adjacent tuned circuit. FIG. 12 shows another tuned circuit arrangement 111 that has twelve tuned circuits 113. The axis of each tuned circuit is oriented at less than 90° with respect to the axes of the adjacent tuned circuits.

The tuned circuit arrangements 101, 111 of FIGS. 11 and 12 each show tuned circuits that are not concentric to each other. Each timed circuit arrangement is located in a housing so as protect tuned circuits from the surrounding environment.

The tuned circuits of FIGS. 11 and 12 can be bonded together at their tangential portions. Alternatively, the tuned circuits need not be in physical contact with the adjacent tuned circuits.

The tuned circuit arrangements of FIGS. 11 and 12 each provide an omnidirectional response pattern. Furthermore, the response is of a sufficiently high magnitude due to the number of tuned circuits. Thus, even though the individual tuned circuits may be physically smaller, for a given size housing, the larger number of tuned circuits compensates for the reduced physical size.

Although the tuned circuits have been described as having concentric coils, they need not be so. Arranging the coils concentrically as shown in FIG. 4 is advantageous in locating large coils in a small volume. However the center of each coil could be spatially separated from the centers of the other coils as shown in FIGS. 11 and 12.

The foregoing disclosure and showings made in the drawings are merely illustrative of the principles of this invention and are not to be interpreted in a limiting sense.

I claim:

1. A passive marker for use in locating buried structures, comprising:

a) two or more tuned circuits, with each of said tuned circuits comprising an inductance and a capacitance, each of said inductors having an axis;

b) said tuned circuits being oriented such that said axes are angled with respect to each other;

c) said oriented tuned circuits being contained within a housing, wherein said tuned circuits are capable of producing a broad directional response, said tuned circuits being electrically insulated from any transmitter or receiver;

d) said marker being buried.

2. The passive marker of claim 1 wherein the plural tuned circuits comprise three tuned circuits that are concentric and substantially orthogonal with respect to each other.

3. The passive marker of claim 1 wherein each of said inductances has an air core.

4. The passive marker of claim 1 wherein each of the tuned circuits are tuned to the same frequency.

5. The passive marker of claim 1 wherein the plural tuned circuits comprise a first tuned circuit and a second tuned circuit, said first tuned circuit being tuned to a first frequency and said second tuned circuit being tuned to a second frequency that is different from said first frequency.

6. The passive marker of claim 1 wherein said housing comprises substantially circular channels on an inside surface of said housing, each of said channels receiving one of said tuned circuits, said channels maintaining said tuned circuits in a substantially orthogonal orientation with respect to each other.

7. The passive marker of claim 6 wherein said housing is nonspherical.

8. The passive marker of claim 6 wherein said housing is spherical.

9. The passive marker of claim 6, wherein said housing has an exterior wall, said channels are formed by indentations in said exterior wall of said housing.

10. The passive marker of claim 6, wherein said channels are formed by interior walls projecting inwardly from an exterior wall of said housing.

11. The passive marker of claim 1, wherein:
 a) each of said inductances comprises a coil having individual turns of wire, with said individual turns of wire being coupled together to form a band;
 b) said tuned circuits abut against an inside surface of said housing.

12. The passive marker of claim 1 wherein each of said inductances is wrapped around a mandrel, with said mandrel being contained within said housing.

13. The passive marker of claim 12 wherein said mandrel is a ball.

14. The passive marker of claim 1, wherein:
 a) the plural tuned circuits comprise three tuned circuits;
 b) each of said inductances comprises a coil of wire with an air core;
 c) said housing comprises channels on an inside surface of said housing, each of said channels receiving one of said tuned circuits therein, said channels maintaining the tuned circuits in a substantially orthogonal orientation with respect to each other.

15. A ground installation, comprising:
 a) a structure buried in the ground;
 b) at least one passive marker buried in the ground adjacent to the structure, with each passive marker comprising:
  i) plural tuned circuits, with each of said tuned circuits comprising an inductance and a capacitance, each of said inductors having an axis, each said tuned circuits having a directional pattern of response;
  ii) said tuned circuits being oriented such that said axes are angled with respect to each other in order to obtain a cumulative directional pattern from said tuned circuits that is broader than the directional pattern of any one of said tuned circuits;
  iii) said tuned circuits being located in a sealed enclosure.

16. The ground installation of claim 15 wherein the plural tuned circuits are substantially orthogonal to each other.

17. The ground installation of claim 15 wherein the plural tuned circuits comprise three tuned circuits that are concentric with respect to each other.

18. The ground installation of claim 15, wherein said sealed enclosure comprises substantially circular channels on an inside surface of said enclosure, each of said channels receiving one of said tuned circuits, said channels maintaining said tuned circuits in a substantially orthogonal orientation with respect to each other.

19. The ground installation of claim 18, wherein said enclosure has an exterior wall, said channels are formed by indentations in said exterior wall of said enclosure.

20. The ground installation of claim 18, wherein said channels are formed by interior walls projecting inwardly from an exterior wall of said enclosure.

21. The ground installation of claim 15, wherein:
 a) said plural tuned circuits comprise three tuned circuits;
 b) each of said inductances comprises a coil of wire with an air core;
 c) said enclosure comprises channels on an inside channel of said enclosure, each of said channels receiving one of said tuned circuits therein, said channels maintaining the tuned circuits in a substantially orthogonal orientation.

22. A method of making a passive marker, said marker for use in locating buried structures, comprising the steps of:
 a) providing plural tuned circuits with each tuned circuit comprising a coil and a capacitance, said coil having individual turns of wire that are coupled together so as to form a band;
 b) providing an enclosure that has guides therein, said guides forming channels on an inside surface of said enclosure, said channels being substantially orthogonal to each other and intersect each other, said enclosure being formed of plural portions;
 c) locating a first one of said tuned circuits in a first one of said channels;
 d) locating a second one of said timed circuits in a second one of said channels, said second one of said tuned circuits being located either around or through a portion of said first one of said tuned circuits;
 e) bringing said enclosure portions together and sealing said enclosure.

23. A passive marker for use in locating hidden structures, comprising:
 a) two or more tuned circuits, with each of said tuned circuits comprising an inductance and a capacitance, each of said inductors having an axis;
 b) said tuned circuits being contained within a housing;
 c) each of said tuned circuits forming a closed circuit within said housing so as to resonate when subjected to an electromagnetic field of a selected frequency, said tuned circuits being oriented such that said axes are angled with respect to each other so as to produce a broader directional resonate response when subjected to the electromagnetic field than any single one of said tuned circuits alone.

24. The passive marker of claim 23 wherein said tuned circuits are electrically insulated from each other.

25. The passive marker of claim 23 wherein each of said inductances comprise of a coil of wire formed into a band, the bands being self supporting, with one of the bands located inside of the other band.

26. The passive marker of claim 23 wherein the tuned circuits comprise three tuned circuits that are concentric and substantially orthogonal with respect to each other.

27. The passive marker of claim 23 wherein the housing is watertight.

28. A passive marker for use in locating a hidden structure, comprising:
 a) plural tuned circuits, with each of said tuned circuits comprising an inductance and a capacitance, each of said tuned circuits producing an electromagnetic response when subjected to an electromagnetic field of a selected frequency;
 b) said tuned circuits being contained in an enclosure, said tuned circuits being electrically insulated from any transmitter or receiver;

c) said tuned circuits being oriented with respect to each other so as to produce an omnidirectional response when said tuned circuits are subjected to said electromagnetic field.

29. The passive marker of claim 28 wherein the enclosure is watertight.

30. The passive marker of claim 28 wherein said enclosure comprises channels on an inside surface of said enclosure, each of said channels receiving one of said tuned circuits.

31. The passive marker of claim 30, wherein said enclosure has an exterior wall, said channels are formed by indentations in said exterior wall of said enclosure.

32. The passive marker of claim 30, wherein said channels are formed by interior walls projecting inwardly from an exterior wall of said enclosure.

* * * * *